United States Patent

Shinada et al.

[11] Patent Number: 5,558,883
[45] Date of Patent: Sep. 24, 1996

[54] MOLD DESIGN AND PROCESS FOR PRODUCING A MULTILAYER PART BY INJECTION PROCESS MOLDING

[75] Inventors: Tsunetoshi Shinada; Katsuo Wada; Masaki Misumi; Satoru Kurono, all of Kanagawa-ken, Japan

[73] Assignees: Mitsui Toatsu Chemicals, Inc.; Moriroku Kabushiki Kaisha, both of Tokyo, Japan

[21] Appl. No.: 365,121

[22] Filed: Dec. 28, 1994

[30] Foreign Application Priority Data

Dec. 28, 1993 [JP] Japan ................................. 5-336056

[51] Int. Cl.$^6$ ........................... B29C 45/14; B29C 45/33; B29C 45/36
[52] U.S. Cl. ..................... 425/116; 264/46.4; 425/117; 425/553; 425/577
[58] Field of Search ............................ 425/116, 117, 425/553, 577, 112, DIG. 48, DIG. 57, 457; 264/46.4; 249/95

[56] References Cited

U.S. PATENT DOCUMENTS

| | | | |
|---|---|---|---|
| 4,358,263 | 11/1982 | Shiraishi et al. | 425/DIG. 48 |
| 4,832,307 | 5/1989 | Watanabe et al. | 425/DIG. 58 |
| 4,889,480 | 12/1989 | Nakamura et al. | 425/DIG. 58 |
| 5,061,419 | 10/1991 | Kouda et al. | 264/46.4 |
| 5,130,074 | 7/1992 | Sakamoto et al. | 264/46.4 |
| 5,204,127 | 4/1993 | Prusha | 425/577 |
| 5,462,422 | 10/1995 | Güstävel | 425/DIG. 48 |

*Primary Examiner*—Khanh P. Nguyen
*Attorney, Agent, or Firm*—Burns, Doane, Swecker & Mathis

[57] ABSTRACT

A molding equipment for making composite molded article having:
- (a) a fixed side mold having a convex portion integral with a gate; the convex portion being formed according to the shape of the molded article; the gate being used for injecting melted resin into a resin molding space;
- (b) a movable side mold capable of being moved close to and away from the fixed side mold; the movable side mold having a concave portion; the concave portion being joined with the convex portion of the fixed side mold (1) to form the resin molding space when the molding equipment is clamped;
- (c) a set of slide cores being mounted between the fixed side mold (1) and the movable side mold; the slide cores being movable toward and away from the fixed side mold; and
- (d) a skin material setting frame being mounted between the fixed side mold and the slide cores; the skin material setting frame being capable of setting a skin material.

8 Claims, 9 Drawing Sheets

MOLD DESIGN AND PROCESS FOR PRODUCING A MULTILAYER PART BY INJECTION PROCESS MOLDING

BACKGROUND OF THE PRESENT INVENTION

This invention relates to a molding equipment for making a composite molded body. More specifically, this invention relates to the manufacture of a composite molded article where a desired skin material is placed on the surface of a plastic substrate by injection-compression molding. The skin material is placed on the surface of the plastic substrate for decorative purposes or to add a desired functional property. This invention also relates to the improvements of molding equipment for making composite molded article and the method for using such molding equipment.

A conventional composite molded article may be exemplified by the interior material used in automobiles and furniture. Usually, such a composite molded article has a plastic substrate covered by a highly decorative skin material such as PVC leather, felt, and the like, using adhesive glue. Very often, since a process of gluing skin material onto plastic substrate is time consuming, the design has to be limited, and the possibility of producing inferior goods and the cost is high. These have been the problems.

For this reason, it has been proposed that a skin material covered composite molded article may be obtained from a stamping molding machine specially designed for this purpose with skin material placed in the mold prior to molding. After covering the mold with skin material, the melted resin is injected into the mold, and the mold is then clamped.

However, when such a prior art stamping molding is used, as soon as the, melted resin is injected into the mold, a portion of the injected resin starts contacting the skin material right away. On the contrary, since the skin material becomes fully covered by the resin only when the clamping is completed, the contact time between the resin and the skin material becomes partially different. In some areas, the resin and the skin material are contacted at high temperature, while in some other areas, the resin and the skin material are contacted when the temperature has dropped to some extent. This has become a drawback because a uniform article cannot be obtained particularly when the scale of molding is large. When it is attempted to overcome this drawback by placing the melted resin evenly on the skin material, the time needed for molding becomes too long, and the deterioration in the physical properties of welded portions due to multiple resin supply results in another problem.

In order to solve the problems noted above, it has been proposed to use a special purpose stamping molding machine which injects and coats the melted resin substantially evenly onto the surface of the skin material and then molds. However, the equipment is highly expensive, the molding cycle is long, and suitable resin materials are limited. In addition, the problem of which the temperature of the resin becomes nonuniform at the time of molding, cannot be completely solved.

Also, with such a special purpose stamping molding machine, the high price of the machine is not the only problem. It is also a problem that a very long time is needed before an article with good quality can be obtained.

In order to solve the problems noted above, it has been disclosed by the present inventors that without using a high cost, special purpose stamping molding machine, a totally uniform composite molded article can be obtained in a short time using a low cost, general purpose injection molding machine. The molding equipment and the method of using this machine have been disclosed in Japanese Patent Laid Open Publication Hei 5-220094. The molding equipment has been characterized by comprising:

(a) a fixed mold having a convex portion integral with a gate; said convex portion being formed according to the shape of the molded article; said gate being used for injecting melted resin into a resin molding space, i.e. a cavity;

(b) a movable side mold capable of being moved close to and away from said fixed mold; said movable mold consisting of a concave portion; said concave portion being formed according to the shape of said molded article; said concave portion being inlaid with said convex portion of said fixed mold to form said resin molding space when said molding equipment is clamped;

(c) a supplemental mold being mounted between said fixed mold and said movable mold; said supplemental mold being movable toward and away from said fixed mold and said movable mold; said supplemental mold having an opening; said opening being smaller than the opening of said concave portion of said movable mold; said opening being sufficiently large for said convex portion of said fixed mold to penetrate, when said molding equipment is clamped; and (d) a skin material setting frame being mounted between said fixed mold and said supplemental mold; said skin material setting frame being capable of setting a skin material.

According to this molding equipment, the special purpose, high cost stamping molding machine is no longer needed in a large scale production of composite molded articles. With this molding equipment, a large scale production of composite molded articles can be carried out using a low cost, general purpose injection molding machine. In addition, there are many advantages in using this molding equipment. For example, the resin does not leak and the end of the skin material is surely molded onto the plastic substrate. The wrinkles on the skin material does not occur. The equipment is simple. The post-treatments after molding are easy. The molding cycle is completed in a short period of time. However, the operating efficiency of this molding equipment was not good because the supplemental mold and the movable mold must be reciprocated more than one time during molding operation.

Furthermore, concerning the manufacture of a so-called "decorativeness-added" composite molded article as mentioned above, a so-called "decorative, one-piece molding method" has become widely used in recent years. The decorative, one-piece molding method simultaneously gives shapes to the skin material and the thermoplastic resin during molding to form an one-piece molded article in one operation. However, since the shape-giving of the skin material and the molding of the thermoplastic resin have to be carried out within one molding procedure to give an one-piece molded article, many cases using such decorative, one-piece molding method encounter a problem in the appearance of the molded article produced. Very often the appearance of the molded article produced is damaged because of the formation of wrinkle in the skin material of the product. To resolve such a problem, the methods described below have been considered.

For example, there is a method in which a skin material is put in the mold after a preliminary shape-giving, and one-piece molding is then carried out. Definitely, in the one-piece molding of the armrest For use in an automobile, as disclosed in Japanese Patent Laid Open Publication SHO 62-256619, a preliminary shape-giving is first carried out to give the shape of the product to a skin material. After the preliminary shape-giving the skin material is then set in the cavity of the mold for use in injection molding. The resin is injected into the cavity and the skin material is pushed and pressed onto the cavity mold. Finally, one-piece, molding is carried out. With carrying out such a preliminary shape-giving first, there has become no more occurrence of wrinkles on the skin material of the product. However, the advantage of one-piece molding is lost because now the preliminary processing is increased, and the equipment and the like for the preliminary shape-giving operation have become necessary.

Furthermore, as a development of the preliminary shape-giving of the skin material, a method in which the preliminary shape-giving and the one-piece molding can be carried out in a series of equipments, has also been proposed (cf. Japanese Patent Laid Open Publication HEI 5-253939). In this method, the skin material is first placed in a mold for use in vacuum molding to have the preliminary shape-giving of the skin material carried out by vacuum molding. While keeping the skin material covering the wall of the cavity side mold, the mold is rotated to face the core mold for use in injection molding, and one-piece molding is then carried out. However, this method is not desirable because the equipment needed in this method is large in scale and is complicated, and a big capital investment is necessary.

As a measure to solve the failure in the appearance of the product due to wrinkles and the like, a method in which a product without the Failure caused by wrinkles and the like, can be obtained by one-piece molding after applying some tension force to a skin material without preliminary shape giving. This method has been proposed in Japanese Patent Laid Open Publication SHO 60-220717. However, the tension force has to be adequately applied according to the thickness and the kind of the skin material. Also, the modification of the tension force to match the shape-giving condition is an extreme difficulty. An equipment which corresponds with all tension force ranges is complicated, and is practically difficult.

As described above, in the skin material-used, decorativeness-adding, one piece molding, although a product with an excellent appearance, i.e., without wrinkles and the like, can be obtained if the preliminary shape-giving of the skin material is carried out first, there is an increase in the number of operations needed in the course of production. Also, when a skin material is used without any preliminary shape-giving, the wrinkles and the like tend to form easily if the skin material is to be disposed in the mold as is. Therefore, it is necessary that some kind of tension force be applied to the skin material. However, this is very difficult since the equipment needed for generating such a tension force, as well as the determination and the setting of the value of the tension force have become complicated. In short, in the decorativeness-adding, one-piece molding, in order to obtain an excellent product with a wrinkle-free appearance, there are problems remained unsolved. Such problems include the increase in the number of operations needed in the course of production, the complication in equipment, and the like.

OBJECTS AND SUMMARY OF THE INVENTION

An object of this invention is to provide a molding equipment for use in the manufacture of composite molded article which overcomes the drawbacks of the prior art.

A further object of this invention is to provide improvement over the molding equipment of Japanese Patent Laid Open Publication HEI 5-220094 for use in the manufacture of composite molded article.

A still further object of this invention is to provide a molding equipment for use in the manufacture of composite molded article which is easy to operate and has a superior operating efficiency.

A still further object of this invention is to provide a method for operating a molding equipment for use in the manufacture of composite molded article which is easy to operate and has a superior operating efficiency.

A still further object of this invention is to provide a molding equipment for use in the manufacture of composite molded article which gives no wrinkles to the molded product with excellent superficial appearance.

Briefly stated, the present invention provides a molding equipment for making a composite molded body comprising:

(a) a fixed mold having a convex portion integral with a gate; said convex portion being formed according to shape of molded article; said gate being used for injecting melted resin into a resin molding space;

(b) a movable side mold capable of being moved close to and away from said fixed mold; said movable mold consisting of a concave portion; said concave portion being formed according to the shape of said molded article; said concave portion being inlaid with said convex portion of said fixed mold to form said resin molding space when said molding equipment is clamped;

(c) a set of slide cores being mounted between said fixed mold and said movable mold; said slide cores being movable toward and away from said fixed mold; said slide cores consisting of a plurality of members; said plurality of members being movable toward and away from each other along a near right angle direction of the moving direction of said movable mold; said slide cores forming an opening at the center when said said plurality of members being moved close to each other; said opening being smaller than the opening of said concave portion of said movable mold; said opening being sufficiently large for said convex portion said fixed mold to penetrate, when said molding equipment is clamped; and (d) a skin material setting frame being mounted between said fixed mold and said slide cores; said skin material setting frame being capable of setting a skin material.

According to an embodiment of the present invention, there is provided a method for making composite molded body with the molding equipment noted above, comprising the steps of;

(a') setting a desired skin material in said skin material setting frame; said skin material setting frame being brought to a position faced to said convex portion of said fixed mold;

(b') drawing said slide cores reciprocally toward a center portion to form an opening; said opening being sufficiently large to allow said convex portion of said fixed mold to penetrate through;

(c') moving said movable mold, said slide cores, and said skin material setting frame toward said fixed mold; placing said slide cores, and said skin material setting frame between said fixed mold and movable said mold;

and closing said slide cores and said skin material setting frame in their pre-determined positions;

(d') filling melted resin into a forming space through a gate of said fixed mold;

(e') moving said movable mold further toward said fixed mold; and clamping said molds under a low pressure;

(f') cooling;

(g') drawing said slide cores reciprocally away from the center portion of the opening;

(h') releasing said skin material from said skin material setting frame;

(i') moving said movable mold away from said fixed mold; and opening said mold;

(j') separating molded article and said mold by a protruding mechanism mounted in fixed side;

(k') removing said molded article; and (l') returning said skin material setting frame to its original skin material setting position.

According to a feature of the invention, there is provided a molding equipment for making composite molded body according to the molding equipment noted above, wherein;

said movable mold and said slide cores are separately movable toward and away from said fixed mold.

According to another feature of the invention, there is provided a molding equipment for making composite molded body according to the molding equipment noted above, wherein;

said slide cores is mounted on said movable mold; and said movable mold and said slide cores are together movable toward and away from said fixed mold.

According to another feature of the invention, there is provided a molding equipment for making composite molded body according to the molding equipment noted above, wherein;

a roundness is added to a angular portion of an edge portion;

said edge portion forms an opening when each of said slide cores is drawn toward the center portion; and said anglar portion is on a side facing said movable mold.

According to another feature of the invention, there is provided a molding equipment for making composite molded body according to the molding equipment noted above, wherein;

a movable slide frame is added to an edge portion;

said edge portion forms an opening when each of said slide cores is drawn toward the center portion; and said movable slide frame is capable of moving toward and away from a direction of a center of said opening.

According to another feature of the invention, there is provided a molding equipment for making composite molded body according to the molding equipment noted above, wherein;

a seat portion is continuously placed on a bottom portion of said convex portion to prevent the formation of wrinkles on said skin material at an end portion of a molded product;

said seat portion has an outside shape same as the shape of said convex portion; and said convex portion of said fixed mold has a height sufficiently higher than the maximum intrusion height of said convex portion of said fixed mold inside said concave portion of said movable mold during molding.

According to another feature of the invention, there is provided a molding equipment for making composite molded body according to the molding equipment noted above, wherein;

when the maximum length (m) in either the vertical or horizontal direction of the projecting area of a molded product is longer than said maximum intrusion height (h) of said convex portion of said fixed mold inside said concave portion of said movable mold during molding, said maximum length (m) makes the height of said seat portion (g) fulfill a relation expressed by g/h; and said g/h is from about 0.5 to about 2.0.

According to another feature of the invention, there is provided a molding equipment for making composite molded body according to the molding equipment noted above, wherein;

When said convex portion of said maximum intrusion height (h) of said fixed mold has a concave portion with a maximum depth (d) at its top surface and said maximum length (m) in either the vertical or horizontal direction of the projecting area of a molded product is longer than (h+d), said convex portion of said maximum intrusion height (h) of said fixed mold makes the height of said seat portion (g) fulfill a relation expressed by g/(h+d); and said g/(h+d) is from about 0.5 to about 2.0.

According to another feature of the present invention, there is provided a method for making composite molded body with the molding equipment noted above, comprising the steps of;

(a') setting a fiber based skin material as said skin material in said skin material setting frame; said skin material setting frame being brought to a position faced to said convex portion of said fixed mold;

(b') drawing said slide cores reciprocally toward the center portion to form an opening; said opening being sufficiently large to allow said convex portion of said fixed mold to penetrate through;

(c') moving said movable mold said slide cores and said skin material setting frame toward said fixed mold; placing said slide cores, and said skin material setting frame between said fixed mold and movable said mold; and closing said slide cores and said skin material setting frame in their pre-determined positions;

(c'-1) releasing said skin material from said skin material setting frame;

(d') filling melted resin into a resin forming space through a gate of said fixed mold;

(e') moving said movable mold further toward said fixed mold; and clamping said molds under a low pressure;

(f') cooling;

(g') drawing said slide cores reciprocally outward (away from center portion of the opening);

(h') moving said movable mold away from said fixed mold; and opening said mold;

(i') separating molded article and said mold by a protruding mechanism mounted in fixed side;

(j') removing said molded article; and (k') returning said skin material setting frame to its original skin material setting position.

The above, and other objects, feature and advantages of the present invention will become apparent from the following description read in conjunction with the accompanying drawings, in which like reference numerals designate the same elements.

The numerals in these figures are summarized below:

1: Fixed side mold
1a: Convex portion
1a-1: Maximum height of product
1a-2: Placenta portion
1b: Gate
1c: Driving equipment
1d: Protruding mechanism
2: Movable side mold
2a: Concave portion
3A–3D: Slide cores
3a: Opening edge portion
31: Slide frame
35: Clearance adjusting screw
36: Clearance adjusting spring
37: Frame plate
4: Skin material setting frame
4a,4b: Plate frame
4c: Air cylinder
5a,5b: Guide rail
6: Skin material
60: Broken edge
7: Melted resin
7a: End region
70: Leaking resin
9: Concave portion
9': Imaged convex portion
11: Bending portion

DETAILED DESCRIPTION OF THE PREFERRED EMBODIMENTS

The molding equipment for making a composite article according to the present invention is basically a molding equipment comprising:

(a) a fixed mold (1) having a convex portion (1a) integral with a gate (1b); said convex portion (1a) being formed according to the shape of a molded article; said gate (1b) being used for injecting the melted resin into a resin molding space;

(b) a movable side mold (2) capable of being moved close to and away from side fixed mold (1); said movable said mold (2) consisting of a concave portion (2a); said concave portion (2a) being formed according to the shape of said molded article; said concave portion (2a) being inlaid with said convex portion (1a) of said fixed of side mold (1) to form a resin molding space (cavity) when said molding equipment is clamped;

(c) a set of slide cores (3A–3D) being mounted between said fixed mold (1) and said movable mold (2); said slide cores (3A–3D) being movable toward and away from said fixed mold (1); said slide cores (3A–3D) consisting of a plurality of members (3A–3D); said plurality of members (3A–3D) being movable toward and away reciprocally along a near right angle direction to the moving direction of said movable mold (2); said slide cores (3A–3D) forming an opening at the center when said plurality of members (3A–3D) are moving close to each other; said opening being smaller than the opening of said concave portion (2a) of said movable mold (2); said opening being sufficiently large for said convex portion (1a) of said fixed mold (1) to penetrate, when said molding equipment is clamped; and (d) a skin material setting frame (4) being mounted between said fixed mold (1) and said slide cores (3A–3D); said skin material setting frame (4) being capable of setting a skin material (6).

In this case, the molding equipment may be constructed in a way that the movable mold (2) and the slide cores (3A–3D) can move separately toward and away from the fixed mold (1). Also, the molding equipment may be constructed with the slide cores (3A–3D) mounted on the movable mold (2), so that the movable mold (2) and the slide cores (3A–3D) can move together toward and away from the fixed mold (1).

In addition, in order to prevent the resin from leaking from the peripheral portion of the article form from the skin material and the resin, it is preferred that a roundness be added to a angular portion of an edge portion where said edge portion forms an opening when each of said slide cores is drawn toward the center portion; and said angular portion is on a side facing said movable mold. Likewise, in order to prevent the skin material from breaking at the edge, it is preferred that a movable slide frame be added to an edge portion where said edge portion forms an opening when each of said slide cores is drawn toward the center portion; and said movable slide frame is capable of moving toward and away from a direction of a center of said opening.

As described, one of the major object of the present invention is to eliminate the occurrence of wrinkles on the product of the composite molded article. In order to achieve this object, a seat portion (1a-2) may be continuously placed on a bottom portion of the convex portion (1a) to prevent the formation of wrinkles on said skin material at end portion of a molded product. Here, the seat portion (1a-2) has an outside shape same as the shape of the convex portion (1a) and the convex portion (1a) of the fixed mold (1) has a height sufficiently higher than the maximum intrusion height (1a) of the fixed mold (1) has a height sufficiently higher than the maximum intrusion height (h) of the convex portion (1a) of the fixed mold (1) inside the concave portion (2a) of the movable mold (2) during molding.

In the above case, it is preferred that when the maximum length (m) in either the vertical or horizontal direction of the projecting area of a molded product is longer than the maximum intrusion height (h) of the convex portion (1a) of the fixed mold (1) inside the concave portion (2a) of the movable mold (2) during molding, the maximum length (m) makes the height of the seat portion (g) fulfill a relation expressed by g/h which is from about 0.5 to about 2.0.

Furthermore, it is preferable that when the convex portion (1a) of the maximum intrusion height (h) of the fixed mold (1) has a concave portion (9) with a maximum depth (d) on its top side and the maximum length (m) in either the vertical or horizontal direction of the projecting area of a molded product is longer than (h+d), the convex portion (1a) of the maximum intrusion height (h) of the fixed mold (1) makes the height of the seat portion (g) fulfill a relation expressed by g/(h+d) which is from about 0.5 to about 2.0.

In addition, the method according to the present invention, for making a composite molded body with the molding equipment noted above, is a method comprising the steps of:

(a') setting a desired skin material in said skin material setting frame; said skin material setting frame being brought to a position faced to said convex portion of said fixed mold;

(b') drawing said slide cores reciprocally toward the center portion to form an opening; said opening being sufficiently large to allow said convex portion of said fixed mold to penetrate through;

(c') moving said movable mold said slide cores and said skin material setting frame toward said fixed mold; placing said slide cores, and said skin material setting frame between said fixed mold and movable mold; and closing said slide cores and said skin material setting frame in their predetermined positions;

(d') filling melted resin into forming space through a gate of said fixed mold;

(e') moving said movable mold further toward said fixed mold; and clamping said molds under a low pressure;

(f') cooling;

(g') drawing said slide cores reciprocally away from center portion of the opening;

(h') releasing said skin material from said skin material setting frame;

(i') moving said movable mold away from said fixed mold; and opening said mold;

(j') separating molded article and said mold by a protruding mechanism mounted in the fixed mold;

(k') removing said molded article; and (l') returning said skin material setting frame to its original skin material setting position.

Here, the aforementioned step (h') may be placed in between steps (c) and (d), when a fiber based skin material is used as the skin material in the molding operation.

Using the construction described above, it has become possible that an uniform composite molded article can be obtained without the special stamping molding machine, but only with a low cost, general purpose injection molding machine. This is because now, using the molding equipment described above, the melted resin can be evenly contacted with the skin material in the shortest time under a low pressure. In addition, there are many advantages in using this molding equipment. Between the movable mold and the supplemental mold, the end of the skin material is surely molded onto the plastic substrate. The wrinkles on the skin material does not occur. The equipment is simple. The treatments after molding are easy. A good operation efficiency is obtained with this molding equipment. The molding cycle is completed in a short period of time.

EXAMPLE

Referring to the drawings attached, the embodiment of the present invention is described below in more detail.

Figure 1:
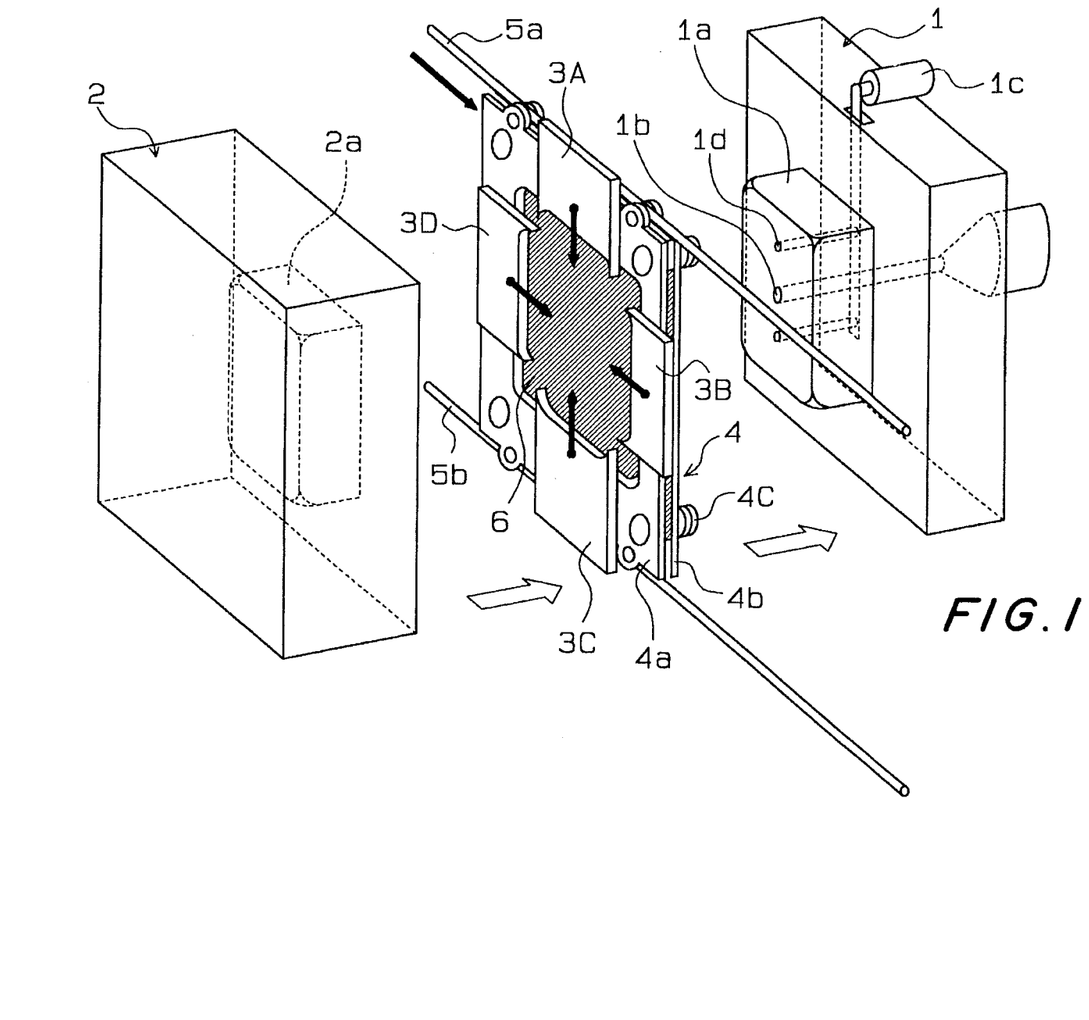
FIG. 1 shows the perspective view of the basic construction of an example of a molding equipment for making composite molded article by injection molding according to the present invention.
Figure 2A:
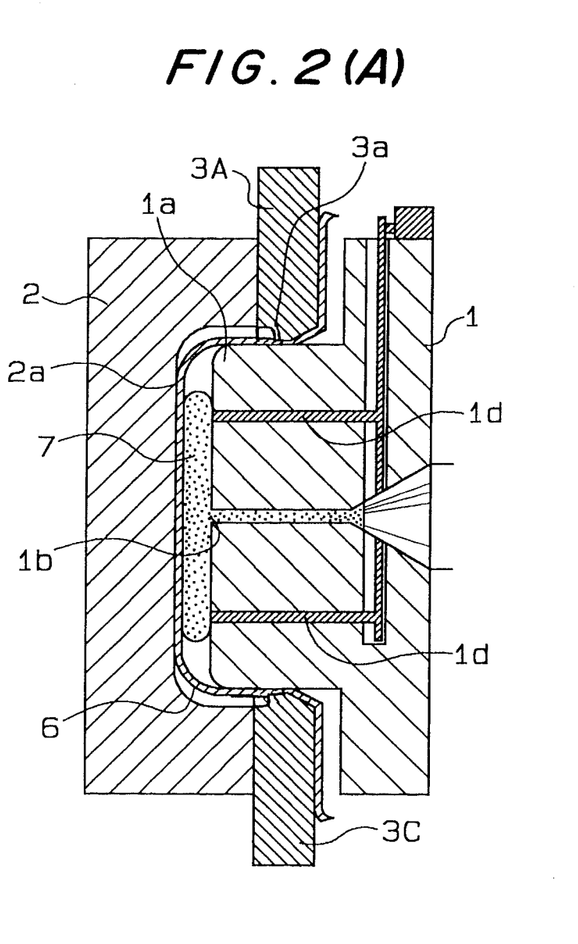
FIGS. 2A and 2B show the vertical cross-section views (a) and (b) during the molding operation of the basic construction shown in FIG. 1.
Figure 4:
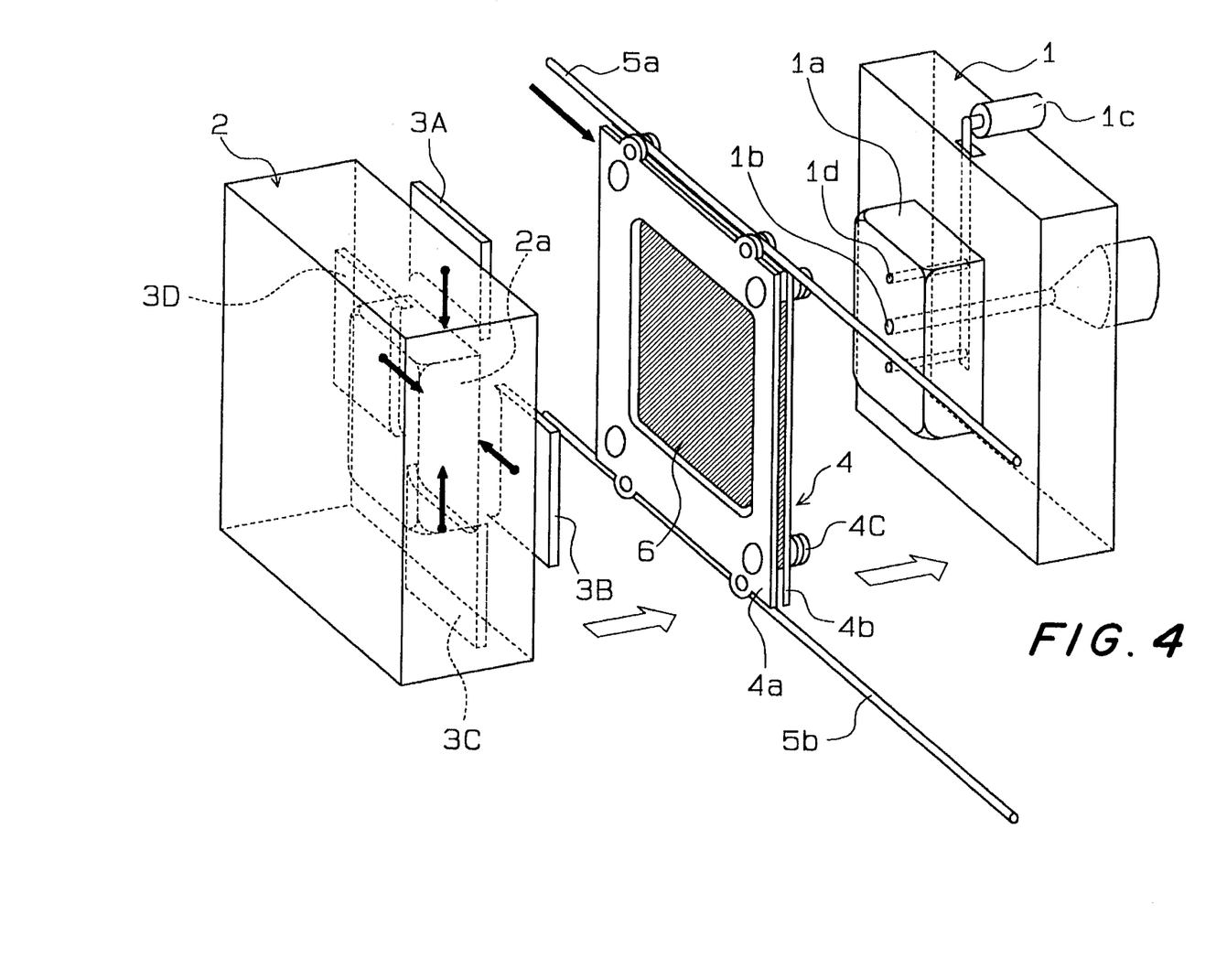
FIG. 4 shows the perspective view of another example of a molding equipment for making composite molded article by injection molding according to the present invention.
Figure 5:
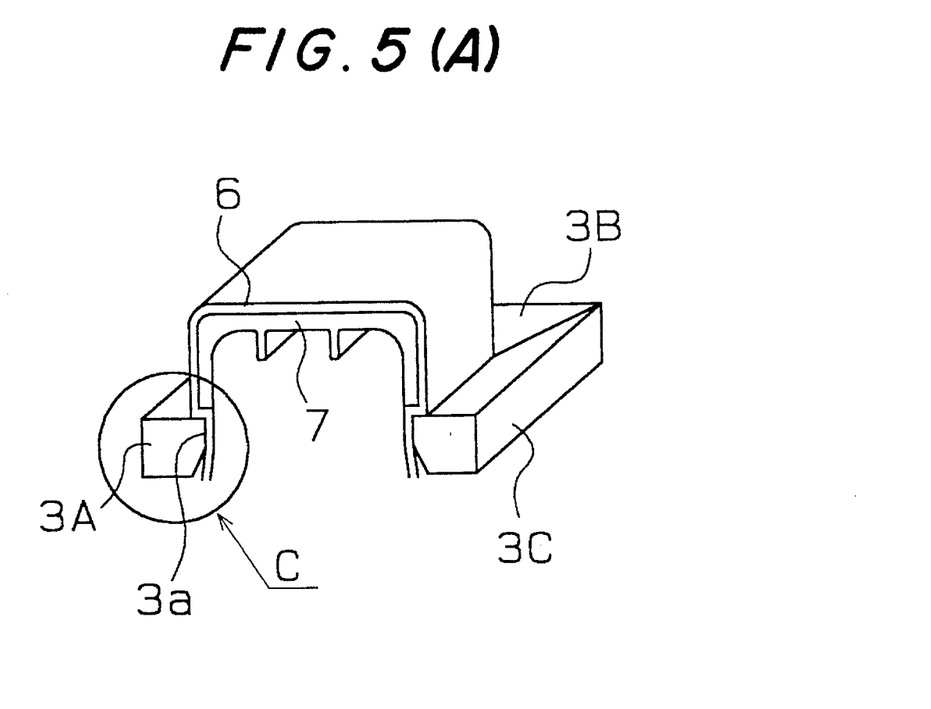
FIGS. 5A and 5B show the schematic diagrams of the molding condition at the end portion of the resin molding portion.
Figure 6:
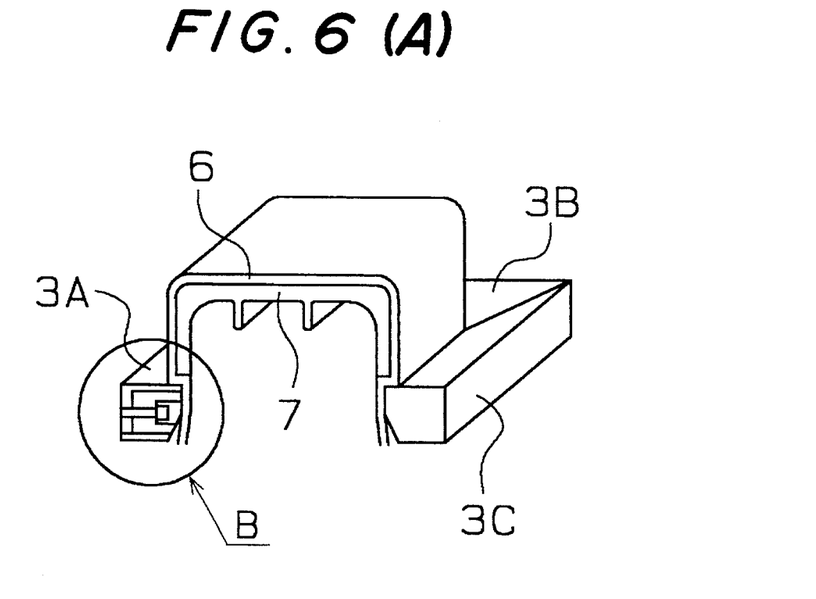
FIGS. 6A and 6B shows the schematic diagram of a desirable example of the slide cores according to the present invention, for preventing the damage of skin material and leaking of resin at the end portion of the resin molding portion.
Figure 7:
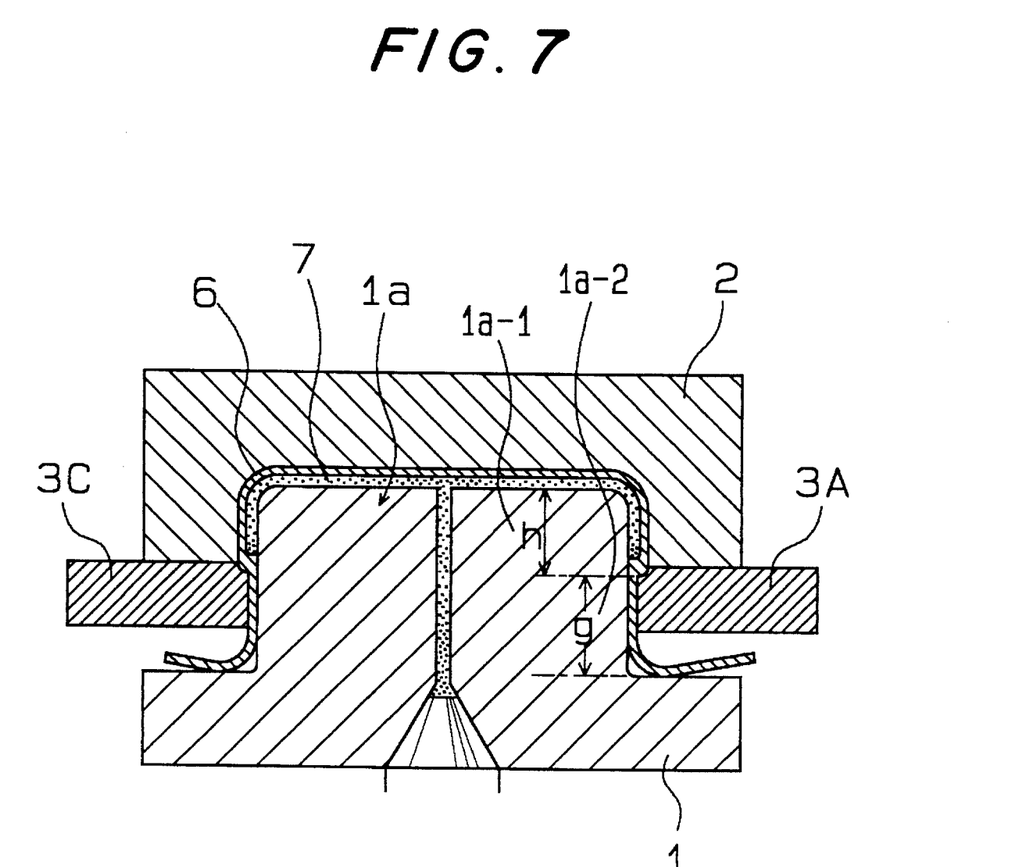
FIG. 7 shows the cross sectional view of a desirable example of the molding equipment according to the present invention, for preventing the occurrence of wrinkles on the skin material at the end portion of the resin molding portion.
Figure 8:
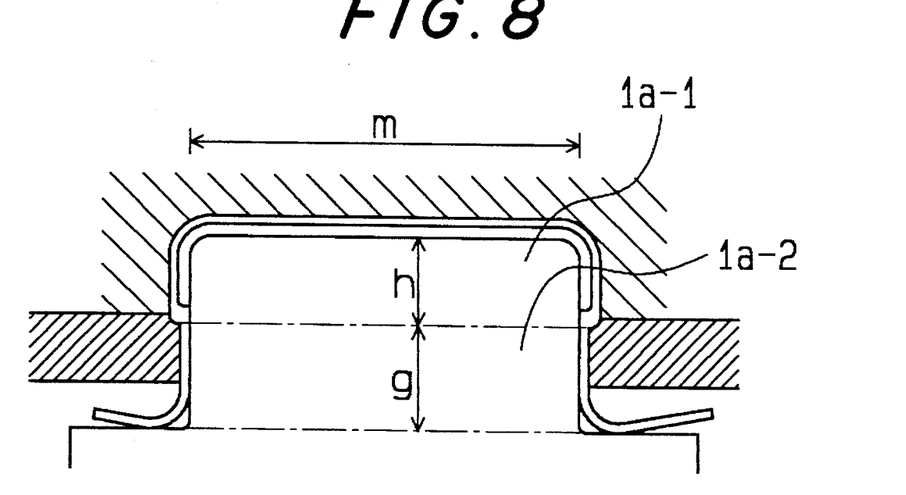
FIG. 8 shows the schematic diagram of a desirable dimension and shape of the molding equipment for preventing the occurrence of wrinkles on the skin material at the end portion of the resin molding portion.
Figure 9:
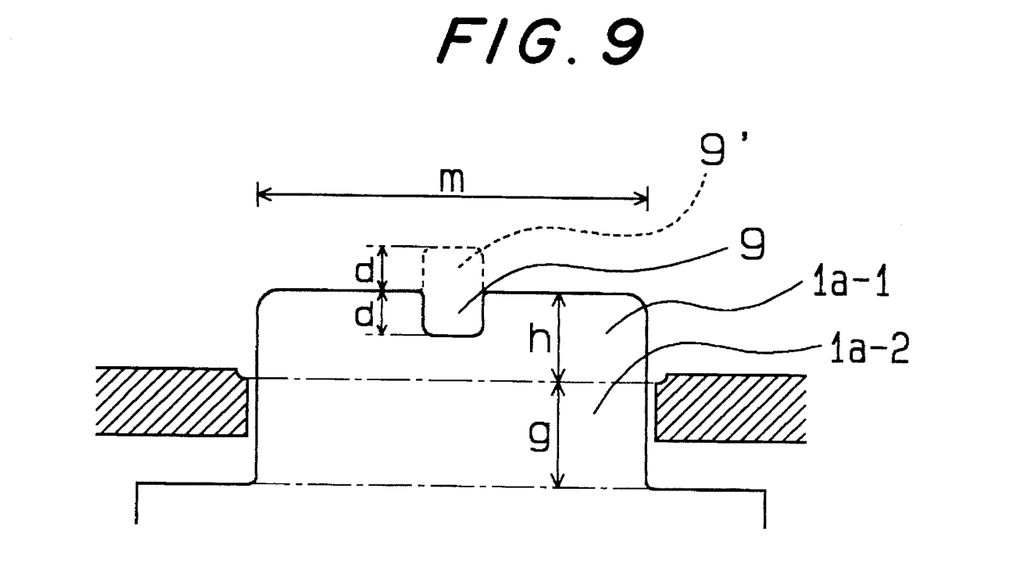
FIG. 9 shows the schematic diagram of a desirable dimension and shape of the molding equipment in another morphology.
Figure 10:
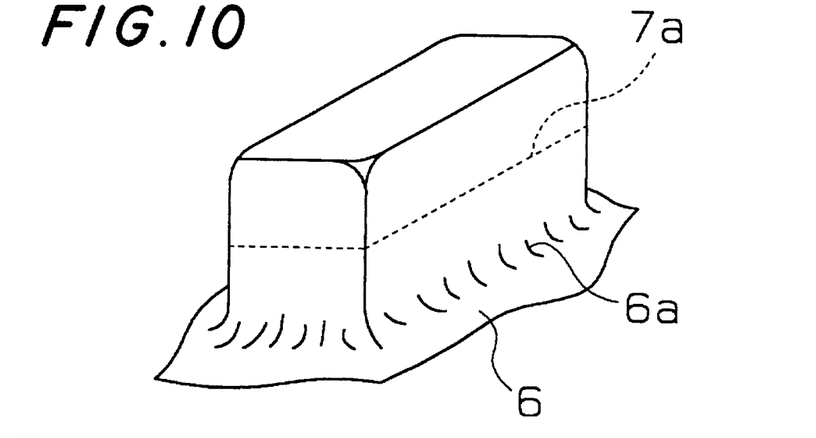
FIG. 10 shows the schematic diagram of a model product of a composite molded article obtained from the molding equipment according to the present invention.
Figure 11:
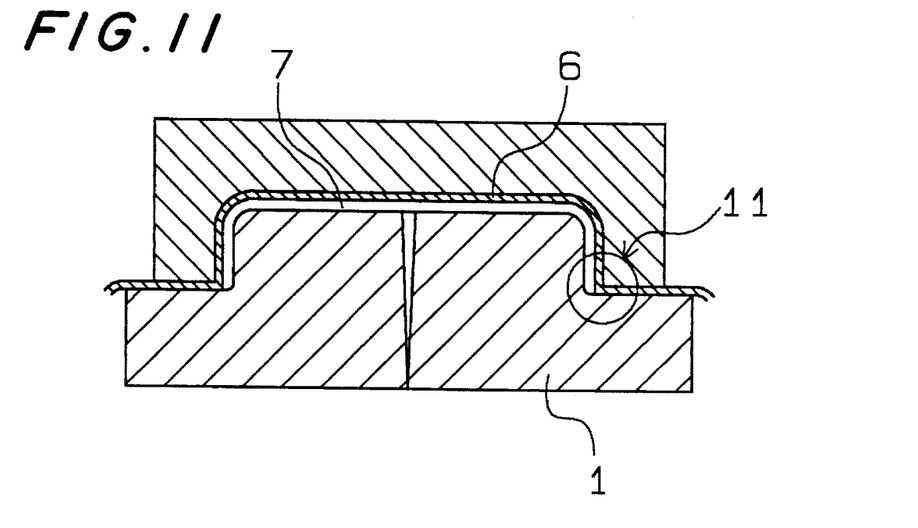
FIG. 11 shows the cross sectional view of a conventional mold.
Figure 12:
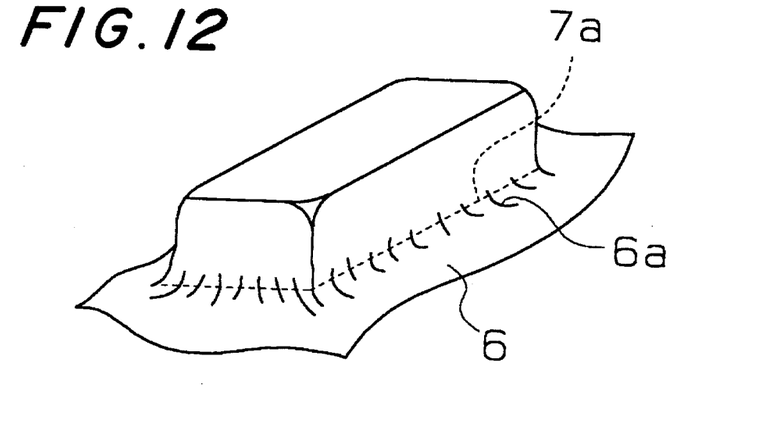
FIG. 12 shows the schematic diagram of a model product of a composite molded article obtained from a conventional mold.

FIG. 1 is the perspective view of the basic construction of an example of a molding equipment for making a composite molded article by injection molding according to the present invention, while FIG. 2 is the vertical cross-section view of the same. FIG. 3 is the perspective view showing the operating condition of the key portion of the basic construction of the present invention. FIG. 4 is the perspective view of another example of a molding equipment for making composite molded article by injection molding according to the present invention. FIG. 5 is the schematic diagrams of the molding condition at the end portion of the resin molding portion. FIG. 6 is the schematic diagrams of the desirable slide cores for preventing damage of skin material and leaking of resin at the end portion of the resin molding portion. Likewise, FIG. 7 is the cross sectional view of a desirable example of the molding equipment according to the present invention, for preventing the occurrence of wrinkles on the skin material at the end portion of the resin molding portion. FIG. 8 is the schematic diagram of a desirable dimension and shape of the molding equipment for preventing the occurrence of wrinkles on the skin material at the end portion of the resin molding portion. FIG. 9 is the schematic diagram of desirable dimension and shape of the molding equipment in another morphology. FIG. 10 is the schematic diagram of a model product of a composite molded article obtained from the molding equipment according to the present invention. Finally, FIG. 11 is the cross sectional view of a conventional mold and FIG. 12 is the schematic diagram of a model product of a composite molded article obtained from a conventional mold.

In FIGS. 1 and 2, numeral 1 is the fixed mold, 2 is the movable mold, and 3A–3D is a set of slide cores. Numeral 4 is the skin material setting frame, while 5a and 5b are the guide rails. 6 is the skin material and 7 is the resin injected.

In fixed mold 1, convex portion 1a is formed according to the shape of the molded article. Accompanying the formation of convex portion 1a, a gate 1b which allows the melted resin be injected into the resins molding space, is disposed. Also, a protruding mechanism 1d for the molded article and its driving equipment 1c are installed.

Movable side mold 2 can be moved close to and away from the fixed mold 1 along the guide rails which are intentionally omitted from the drawing. Movable side mold 2 consists of a concave portion 2a which is formed according to the shape of the molded article. Concave portion 2a is inlaid with the convex portion 1a of the fixed mold 1 to form the resin molding space when the molding equipment is clamped.

A set of slide cores 3A, 3B, 3C and 3D are mounted between the fixed mold 1 and the movable mold 2. As shown by the arrow marks, the slide cores 3A, 3B, 3C and 3D are reciprocally movable toward and away from, along a near right angle direction to the moving direction of the movable mold 2. (In order to avoid the complication of the drawing, the driving mechanism is intentionally omitted.) Slide cores 3A, 3B, 3C and 3D form an opening at the center when they are moving close to each other. The opening is smaller than the opening of the concave portion 2a of the movable mold 2, but sufficiently large for the convex portion 1a of the fixed mold 1 to penetrate, when the molding equipment is clamped.

Skin material setting frame 4 comprises two pieces of plate frames 4a and 4b and an air cylinder 4c. The two pieces of plate frames 4a and 4b hold and keep the skin material 6, while air cylinder 4c opens and closes these two pieces of plate frames 4a and 4b during the skin material setting operation. Skin material 6 is set by a skin material supplying equipment which is not shown in the drawings. The setting skin material 6 by skin material supplying equipment, skin material setting frame 4 is guided to the molding operating position along guide rail 5a and 5b, and disposed between fixed mold 1 and slide cores 3A–3D.

Furthermore, when a composite molding article is produced by injection molding using the above noted molding equipment, the operation starts with keeping movable mold 2 in a condition sufficiently away from fixed mold 1. After setting the desired skin material 6 in skin material setting frame 4, the whole skin material setting frame 4 is moved, along guide rail 5a and 5b, to a position facing convex portion 1a of fixed mold.

Successively, slide cores 3A–3D are drawn reciprocally toward the center portion and stopped at a position where the opening formed allows convex portion 1a of fixed mold 1 to penetrate through it (of. FIG. 3).

Movable side mold 2, slide cores 3A–3D, and skin material setting frame 4 are then drawn toward fixed mold 1, as shown by the white arrow marks in FIG. 1. When slide cores 3A–3D and skin material setting frame 4 are sandwiched between fixed mold 1 and movable mold 2, the molding equipment is closed. By the closing of the molding equipment, convex portion 1a of fixed mold 1 penetrates through the opening formed in the center portion by slide cores 3A–3D and inserts into concave portion 2A of movable mold 2. At the same time, skin material 6 is also pushed into concave portion 2a by convex portion 1a. At this moment, the molding equipment is closed in a pre-determined position in which a gap between convex portion 1a of fixed mold 1 and concave portion 2a of movable mold 2 has become about 5 to 30 mm (cf. FIG. 2 (a)). When the gap is less than 5 mm, the flow pattern of the supplied resin becomes visible on the skin material which is an undesirable case. On the contrary, when the gap is more than 30 mm, the supplied resin tends to fall because of its gravity. This generates another undesirable case because the resin cannot be pressed evenly.

Figure 2B:
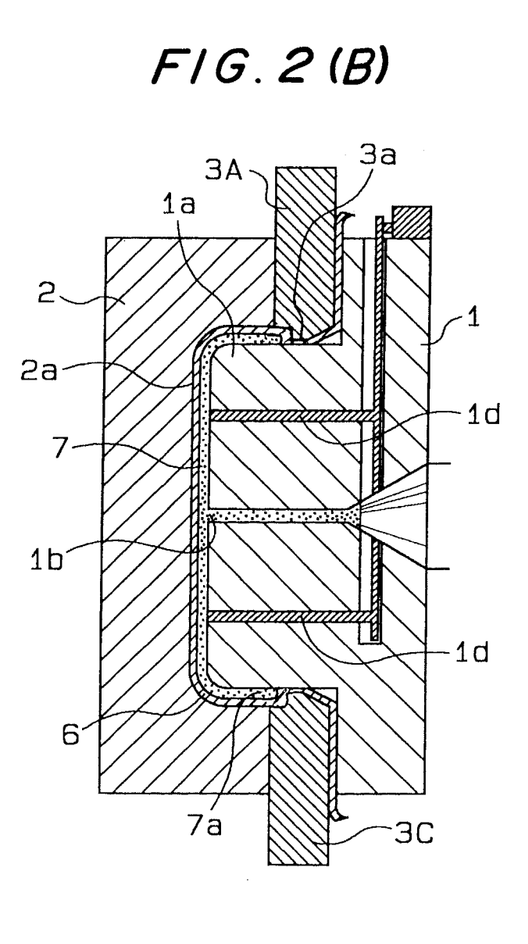
Figure 3:
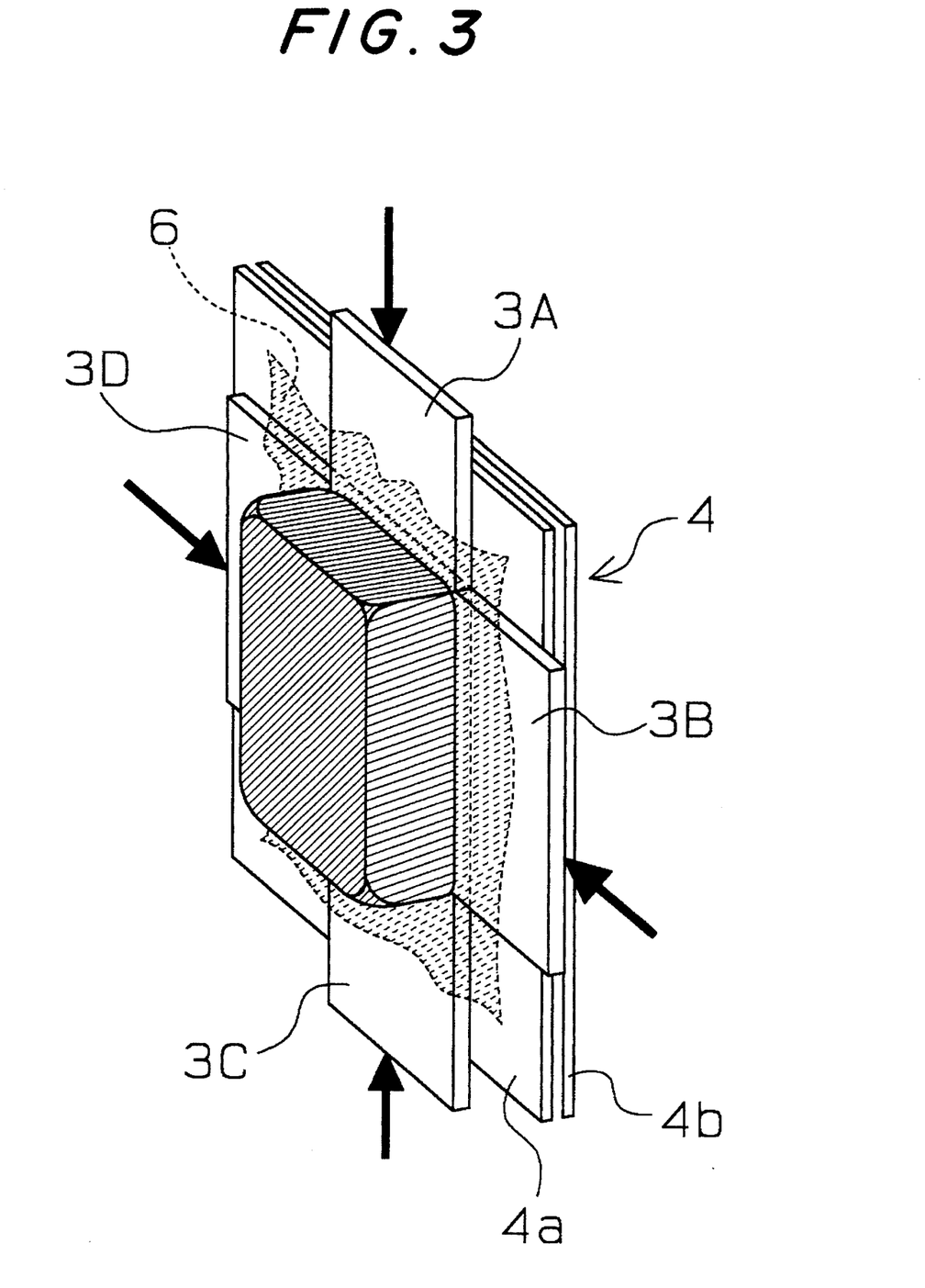
FIG. 3 shows the perspective view of the operating condition of the key portion during the molding operation.

Then, as shown in FIG, 2 (a) and (b), after injecting the melted resin 7 into the resin molding space from gate 1b of fixed mold 1, movable mold 2 is further moved toward fixed mold 1, and the molding equipment is locked under a low pressure (cf. FIG. 2 (a) and (b), and FIG. 3 ).

Successively, after cooling the melted resin 7 until it is solidified, movable mold 2 alone is moved along the direction away from fixed mold 1 to open the molds, while skin material setting frame 4 and slide cores 3A–3D are still kept in the side of fixed mold 1.

Successively, after cooling (the melted resin 7 is cooled until it is solidified), slide cores 3A–3D are drawn outward away from the center portion, along the reversed direction of the arrow marks in FIG. 1. By operating air cylinder 4c, the two pieces of plate frames 4a and 4b are released, and skin material 6 is released from skin material setting frame 4. Successively, the product is released from the molding equipment by protruding mechanism 1d.

The skin material to be used in this step may be any kind of skin material. It is preferred to use a sheet based skin material such as polyvinyl chloride sheet, thermoplastic elastomer sheet, and like. When a cloth such as a cloth made of moquette, tricot, knitted goods, and the like, or made of nonwoven fabric is used as the fabric based skin material, skin material 6 not only can be released from skin material setting frame 4 in this step, but also can be released from skin material setting frame 4 in an alternative way. Namely, prior to the resin injecting step which injects the melted resin into the aforementioned resin forming space, the two pieces of plate frames 4a and 4b can be released by the operation of air cylinder 4c, and skin material 6 is released from skin material setting frame 4.

Finally, slide cores 3A–3D and skin material setting frame 4 are moved along the direction away from fixed mold 1.

With the construction described above, since the size of the opening formed at the center of slide cores 3A–3D is smaller than that of the opening of concave portion 2a of movable mold 2 during molding, and as can be seen in FIG. 2, skin material 6 is wrapped to the position of end portion 7a of melted resin 7 and contacted, the leaking of resin is prevented. Since skin material 6 of the composite molded articles folded inward from the edge of the product, the post-treatment of the residue of the skin material has become easy. Also, since slide core 3A–3D consists of a plurality of members and is movable toward and away from reciprocally along a near right angle direction to the moving direction of said movable mold 2, it is not needed that movable mold or the slide cores be reciprocated against the fixed mold more than one time during molding operation. This remarkably improves the operating efficiency of the molding equipment.

Usually, in the one-piece molding of a skin material and a plastic substrate according to the present invention, the widely used, general purpose thermoplastic resin may be used. Here, as a general purpose thermoplastic resin, polystyrene resin, acrylonitrile-butadiene-styrene resin (ABS resin), low density polyethylene resin, high density polyethylene resin, polypropylene resin, polyvinyl resin, polyvinyl chloride resin, and the like, and the combination thereof may be used. A polymer alloy of a resin mentioned above and another engineering resin is also included. The general purpose thermoplastic resin made by composing the above mentioned rosin with a glass fiber, talc, mica, and the like, or with a plasticizer, mold lubricant, antistatic agent, and other additive is also included. The general purpose thermoplastic resin kneaded with a pigment, dyestuff, and the like is also included.

Additionally, as the surface layer of a decorativeness-adding skin material, a sheet based skin material such as polyvinyl chloride sheet, thermoplastic elastomer sheet, and the like, or fabric based skin material such as a cloth made of moquette, tricot, knitted goods, and the like, or a cloth made of nonwoven fabric may be used. The aforementioned-surface layer may be a single layer or a multiple layer. When "a feeling of soft-touch" desired, a polyurethane foam layer or polyolefin foam layer may be used as the surface layer. Furthermore, various sheet, nonwoven fabric, and the like may be glued under the aforementioned form layer as a lining to foam a multiple layer construction.

In the aforementioned example, the molding equipment has been constructed in a way that the movable side mold 2 and slide core 3A–3D can move separately toward and away from the fixed mold 1. However, as can be seen in FIG. 4, the molding equipment may be constructed with the slide cores 3A–3D mounted on the movable mold 2, so that the movable mold 2 and the slide core 3A–3D can move together toward and away from the fixed mold 1.

Namely, as shown by the arrow marks, a group of slide cores 3A, 3B, 3C, and 3D is reciprocally movable toward and away from, along a near right angle direction to the moving direction of movable mold 2. This is because of the driving mechanism installed in movable mold 2 (the driving mechanism is intentionally omitted in the drawings). The group of slide cores 3A, 313, 3C, and 3D forms an opening at the center when its members are moving close to each other. The opening is smaller than the opening of the concave portion 2a of the movable mold 2, but sufficiently large for the convex portion 1a of the fixed mold 1 to penetrate, when the molding equipment is clamped. As described, by mounting the group of slide core 3A, 3B, 3C, and 3D on movable mold 2, the whole construction of the equipment can be relatively more simple than the one shown in FIG. 1.

In the above-mentioned molding equipment, when the morphology of edge portion 3a of the opening formed by the group of slide cores 3A, 3B, 3C, and 3D is same as the one shown FIGS. 2 and 5, skin material 6 tends to breaks at the edge and the resin tends to leak. Namely, the schematic diagrams of slide core 3A, 3C, and the injected resin 7, and skin material 6 during the molding can been in FIG. 5(A). FIG. 5(B) is an enlarged cross-sectional view of the circled area of FIG. 5(A). Since; the clearance W between edge portion 3a of the opening formed by slide core 3A and convex portion 1a of fixed side mole 1 is fixed, and the tension applied to skin material 6 is constant, as shown in FIG. 5(B), skin material 6 tends to breaks at edge 60 and the resin tends to leak at 70.

Here, as shown in FIG. 6, by installing a side frame 31 in the edge portion of the opening of a slide core in which the slide frame is movable toward and away from the direction of the center of the opening, by making clearance w changeable between convex la of the fixed side mold and the edge portion of the opening of a slide core, by having a construction which makes the tension applied to skin material 6 adjustable, and by adding a roundness 30 to the angular portion of the edge portion of the opening in the side that the slide core faces the movable side mold, it has become possible to prevent the breaking of edge, of skin material 6 and to prevent the leaking resin. In FIG. 6 (B), 35 is a clearance adjusting screw, 36 is the clearance adjusting spring, and 37 is a frame plate. Similarly, slide frames are also attached to slide cores 3B, 3C, and 3D.

Next, a preferred embodiment for the prevention of the occurrence of wrinkle of skin material in the end portion of the product according to the present invention is described.

Conventionally, in processing the shape-giving of the skin material with the decorativeness-adding, one-piece molding, the configuration of the end portion of the skin material and the end portion of the product has not been clarified. As shown in FIG. 11, a bending portion 11 of skin material is formed in the end portion of the product. As shown in FIG. 12, a number of wrinkles 6a are formed on the skin material in the range of the end portion 7a of the product. However, as can be seen in FIG. 7, if the configuration of the end range of the skin material has been made so that a length g is added straightly along the direction extended from the end portion of the product, the bending portion of the skin material disappears near end portion 7a of the product. Then, it has become easy to induce the skin material to the product portion when the mold is clamped, and no more wrinkle forms on the skin material in the end portion of the product.

Here, if a seat portion 1a-2 which has an outside shape the same as the shape of convex portion 1a is continuously placed on the bottom portion of the convex portion, and if the height of the whole convex portion 1a is sufficiently larger than the height h of the maximum product height portion 1a-1 (hereafter, simply called "intrusion portion 1a-1") which intrudes into the concave portion 2a of movable side mold 2 during molding, the prevention of the occurrence of wrinkles on the skin material in the end portion of the product is effective.

This can be further explained in more detail in FIG. 8. The seat portion 1a-2 for use in induction is effective in the prevention of the occurrence of wrinkles on the skin material in the end portion of the product, when a maximum length m in either the vertical or horizontal direction of the projecting area of a molded product is longer than height h of intrusion portion 1a-1. On the contrary, if the maximum length m is shorter than height h of intrusion portion 1a-1, this case becomes a deep drawing. For deep drawing, the one-piece molding of a skin material by injection molding is generally not used. It is beneficial that a shape-giving process be carried out by compression molding, vacuum molding and the combination thereof.

Moreover, when a maximum length m is longer than height h of intrusion portion 1a-1, and the seat portion 1a-2 for use in induction is effective, it will be even more effective if the relation between the height g of the seat portion and height h of the intrusion portion can be expressed by a g/h ratio which is in the range of from about 0.5 to about 2.0. Namely, if the g/h is less than 0.5, even if a seat portion 1a-2 for use in the induction of the skin material is placed straightly along the direction extended from the end portion of the product, the wrinkle forms on the skin material in the end portion of the product because the inducing portion is too short. Conversely, if g/h is larger than 2.0, although the wrinkles tend not to form on the skin material in the end portion of the product because of the long inducing portion, this is not preferred. This is because that, if g/h is larger than 2.0, the size of the mold itself becomes too large in terms of practical mold manufacturing, the waste of skin material becomes too much, and the costs for processing and the like increase. In addition, a runner of a resin injection gate becomes too long, the stable supply of resin is interfered, causing problems in productivity. Therefore, the prevention of the occurrence of wrinkle on the skin material in the end portion of the product is effective only when the height g of seat portion 1a-2 has a g/h ratio which is in the range of from about 0.5 to about 2.0.

Based on similar consideration, this can be applied to a product which has a shape with a concave portion. An example is shown in FIG. 9. Namely, when a product (convex portion 1a of fixed side mold) has a concave portion 9 which has a depth d, it is considered that the length of the skin material to be taken into the mold is same as an imaged intrusion portion on the top of the product where the imaged intrusion portion has an imaged convex 9' with a depth d. Accordingly, the sum of the height h of the intrusion portion of the convex portion of the fixed side mold and the height d of the imaged convex portion becomes the height of the imaged intrusion portion. Similar to the aforementioned case, when the maximum length m of the projecting area of the product is larger than the height (h+d) of the imaged intrusion portion, the seat portion for use in the induction of the skin material is effective. If the maximum length m of the projecting area of the product is smaller than the height (h+d) of the imaged intrusion portion, the aforementioned compression molding is preferably used over the use of an injection molding machine for the one-piece molding of skin material.

When the aforementioned maximum length m of the projecting area of the imaged product is larger than the height (h+d) of the imaged intrusion portion arid tire seat portion for use in the induction of the skin material is effective, it will be even more effective if the relation between the height g of the seat portion and height h of the intrusion portion can be expressed by a g/(h+d) ratio which is set in the range of from about 0.5 to about 2.0. If the g/(h+d) ratio is less than 0.5, the wrinkle forms on the skin material in the end portion of the product because the inducing portion is too short. Also, if the g/(h+d) ratio is larger than 2.0, there are problems in the practical mold manufacturing.

By installing such a seat portion 1a-2, there is no occurrence of wrinkles on the skin material in the end portion of the product in the one-piece molding of skin material, and a product with good appearance is obtained.

Since the present invention has tire construction described above, when a molding equipment according to the present invention is used, the melted resin can be evenly contacted with the skin material in the shortest time under a low pressure without the special stamping molding machine, but only with a low cost, general purpose injection molding machine. Hence, an uniform composite molded article is obtained. In addition, there are many advantages in using this molding equipment. For instance, between the movable side mold and the slide cores, the end of the skin material is surely rolled in. The presence of wrinkles on the skin material does not occur. Particularly, the occurrence of wrinkles on the skin material in the end portion of the product can be prevented. The equipment is simple. The operating efficiency is superior as the operation is simple. The post-treatments after molding are easy. The molding cycle is completed in a short period of time.

Having described preferred embodiments of the invention, it is to be understood that the invention is not limited to those precise embodiments, and that various changes and modifications may be effected therein by one skilled in the art without departing from the scope or spirit of the invention as defined in the appended claims.

What is claimed is:

1. A molding equipment for making a composite molded article comprising:

(a) a fixed side mold having a convex portion integral with a gate, said convex portion being formed according to the shape of the molded article, said gate being used for injecting melted resin into a resin molding space;

(b) a movable side mold capable of being moved close to and away from said fixed side mold, said movable side mold having a concave portion, said concave portion being formed according to the shape of said molded article, said concave portion being inlaid with said convex portion to form said resin molding space when said molding equipment is clamped;

(c) a set of slide cores comprising a plurality of members being mounted between said fixed side mold and said movable side mold, said slide cores being movable toward and away from said fixed side mold, said slide cores being reciprocally movable toward and away along a near right angle direction to the moving direction of said movable side mold, said side cores forming an opening at the center when said slide cores are moved close to each other wherein said opening is smaller than said concave portion and said opening is sufficiently large for said convex portion to penetrate when said molding equipment is clamped; and (d) a skin material setting frame mounted between said fixed side mold and said slide cores, said skin material setting frame being capable of setting a skin material.

2. The molding equipment for making a composite molded article according to claim 1 wherein said movable side mold and said slide cores are separately movable toward and away from said fixed side mold.

3. The molding equipment for making a composite molded article according to claim 1 wherein said slide cores are mounted on said movable side mold and said movable side mold and said slide cores are together movable toward and away from said fixed side mold.

4. The molding equipment for making a composite molded article according to claim 1 wherein each of said slide cores has a rounded edge on a side facing said movable side mold.

5. The molding equipment for making a composite molded article according to claim 1 wherein a movable slide frame is installed in each edge of said slide cores and said movable slide frame is capable of moving toward and away from the center of said opening.

6. The molding equipment for making a composite molded article according to claim 1 wherein said convex portion has a seat portion that is sufficiently higher than a maximum intrusion height (h) of said convex portion inside said concave portion during molding, said seat portion being continuously located on a bottom portion of said convex portion to prevent the formation of wrinkles on said skin material at an end portion of the molded article and said seat portion has an outside shape the same as the shape of said convex portion.

7. The molding equipment for making a composite molded article according to claim 6 wherein when a maximum length (m) of a projecting area of the molded article is longer than said maximum intrusion height (h) of said convex portion of said fixed side mold inside said concave portion of said movable side mold during molding, said maximum length (m) makes the height (g) of said seat portion fulfill a relationship expressed by g/h wherein g/h is from about 0.5 to about 2.0.

8. The molding equipment for making a composite molded article according to claim 6 wherein when said convex portion of said maximum intrusion height (h) of said fixed side mold has a concave portion with a maximum depth (d) on its top side and a maximum length (m) of the projecting area of a molded product is longer than (h+d), said convex portion of said maximum intrusion height (h) of said fixed side mold makes the height of said seat portion (g) fulfill a relationship expressed by g/(h+d) wherein g/(h+d) is from about 0.5 to 2.0.

* * * * *